United States Patent
Berger et al.

(10) Patent No.: US 11,010,307 B2
(45) Date of Patent: *May 18, 2021

(54) CACHE MANAGEMENT

(71) Applicant: INTERNATIONAL BUSINESS MACHINES CORPORATION, Armonk, NY (US)

(72) Inventors: Deanna P. D. Berger, Hyde Park, NY (US); Christian Jacobi, West Park, NY (US); Martin Recktenwald, Schoenaich (DE); Yossi Shapira, Shoham (IL); Aaron Tsai, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/699,883

(22) Filed: Dec. 2, 2019

(65) Prior Publication Data

US 2020/0104265 A1 Apr. 2, 2020

Related U.S. Application Data

(63) Continuation of application No. 15/996,646, filed on Jun. 4, 2018, now Pat. No. 10,528,482.

(51) Int. Cl.
*G06F 12/123* (2016.01)
*G06F 12/0817* (2016.01)
(Continued)

(52) U.S. Cl.
CPC ........ *G06F 12/123* (2013.01); *G06F 12/0246* (2013.01); *G06F 12/084* (2013.01);
(Continued)

(58) Field of Classification Search
CPC ............ G06F 12/0811; G06F 12/0815; G06F 12/0817; G06F 12/0802; G06F 12/084;
(Continued)

(56) References Cited

U.S. PATENT DOCUMENTS 5,517,626 A 5/1996 Archer
6,073,211 A 6/2000 Cheng
(Continued)

OTHER PUBLICATIONS

J. H. Kelm, D. R. Johnson, W. Tuohy, S. S. Lumetta and S. J. Patel, "Cohesion: An Adaptive Hybrid Memory Model for Accelerators," in IEEE Micro, vol. 31, No. 1, pp. 42-55, Jan.-Feb. 2011, doi: 10.1109/MM.2011.8. (Year: 2011).*

(Continued)

*Primary Examiner* — Khoa D Doan
(74) *Attorney, Agent, or Firm* — L. Jeffrey Kelly

(57) ABSTRACT

A method, a computer system, and a computer program product to perform a directory lookup in a first level cache for requested cache line data. A first processor core can detect that the requested cache line data is not found in a plurality of sets of data in the first level cache and detect that existing cache line data stored in a least recently used data set stored in the first level cache is in an exclusive state, wherein the existing cache line data stored in the least recently used data set is to be overwritten by the requested cache line data retrieved from a second level cache. Furthermore, the first processor core can send a request for the requested cache line data and a physical address of the least recently used data set to the second level cache and execute additional instructions based on the first level cache and data retrieved from the second level cache.

20 Claims, 6 Drawing Sheets

(51) Int. Cl.
*G06F 12/0811* (2016.01)
*G06F 12/02* (2006.01)
*G06F 12/084* (2016.01)

(52) U.S. Cl.
CPC ...... *G06F 12/0811* (2013.01); *G06F 12/0817* (2013.01); *G06F 2212/7201* (2013.01)

(58) Field of Classification Search
CPC ................ G06F 12/0842; G06F 12/12; G06F 12/121–124; G06F 2212/7201
See application file for complete search history.

(56) References Cited

U.S. PATENT DOCUMENTS

| | | | |
|---|---|---|---|
| 6,115,794 | A | 9/2000 | Arimilli |
| 6,725,337 | B1 | 4/2004 | Tan |
| 7,836,257 | B2 | 11/2010 | Dorsey |
| 9,058,272 | B1 | 6/2015 | O'Bleness |
| 10,528,482 | B2 | 1/2020 | Berger |
| 2002/0116438 | A1 | 8/2002 | Tu |
| 2002/0124143 | A1 | 9/2002 | Barroso |
| 2003/0140199 | A1 | 7/2003 | Kunkel |
| 2003/0200397 | A1 | 10/2003 | McAllister |
| 2007/0073974 | A1 | 3/2007 | Averill |
| 2007/0174554 | A1 | 7/2007 | Hutton |
| 2007/0250667 | A1 | 10/2007 | Dement |
| 2009/0216947 | A1* | 8/2009 | Bohn .................. G06F 12/0882 711/118 |
| 2009/0216949 | A1* | 8/2009 | Krumm ............... G06F 12/0817 711/122 |
| 2010/0030965 | A1 | 12/2010 | Uzar |
| 2011/0202727 | A1 | 8/2011 | Speier |
| 2012/0005439 | A1 | 1/2012 | Ukai |
| 2012/0059996 | A1 | 3/2012 | Habermann |
| 2014/0136785 | A1 | 5/2014 | Colglazier |
| 2015/0269074 | A1 | 9/2015 | Shah |
| 2017/0123841 | A1 | 5/2017 | Greiner |
| 2018/0032439 | A1 | 2/2018 | Jenne |
| 2018/0365151 | A1 | 12/2018 | Zoellin |

OTHER PUBLICATIONS

IBM: List of IBM Patents or Patent Applications Treated as Related (Appendix P), Feb. 5, 2020, pp. 1-2.

IBM, "IBM z14, designed to help you build leadership in trusted digital experiences", IBM United States Hardware Announcement, 117-044, dated Jul. 17, 2017, pp. 1-123, Grace Period Disclosure.

Jaeheon Jeong, Mitchel Dubois, "Cost-Sensitive Cache Replacement Algorithms", 2003, The Ninth International Symposium on High-Performance Computer Architecture. (Year: 2003).

Jingyu Deng, Yun Liang, Goujie Lou, Guangyu Sun, "Rapid design space exploration of two-level unified caches", 2014, IEEE (Year: 2014).

Mell, et al., "The NIST Definition of Cloud Computing," National Institute of Standards and Technology, U.S. Department of Commerce, Special Publication 800-145, Sep. 2011, pp. 1-7.

* cited by examiner

CACHE MANAGEMENT

STATEMENT REGARDING PRIOR DISCLOSURES BY THE INVENTOR OR A JOINT INVENTOR

Aspects of the present invention may have been disclosed by the inventor, or a joint inventor, in the product IBM® z14 (IBM is a registered trademark of International Business Machines Corporation), made available to the public on Jul. 17, 2017. These aspects, as they may appear in the claims, may be subject to consideration under 35 U.S.C. § 102(b)(1)(A).

BACKGROUND

The present disclosure relates to managing cache devices, and more specifically, but not exclusively, to retrieving data from a cache for executing instructions.

SUMMARY

According to an embodiment, a computer system for managing cache devices is provided. The present invention may include a first processor core to perform a directory lookup in a first level cache for requested cache line data, wherein the requested cache line data is requested by an instruction executed by the first processor core. The first processor core can also detect that the requested cache line data is not found in a plurality of sets of data in the first level cache and detect that an existing cache line data stored in a least recently used data set stored in the first level cache is in an exclusive state, wherein the existing cache line data stored in the least recently used data set is to be overwritten by the requested cache line data retrieved from a second level cache. Additionally, the first processor core can send a request for the requested cache line data and a physical address of the least recently used data set to the second level cache and execute additional instructions based on the first cache and data retrieved from the second cache to replace the least recently used data set.

According to another embodiment, a method for managing cache devices is provided. The present invention may include performing a directory lookup in a first level cache for requested cache line data, wherein the requested cache line data is requested by an instruction executed by the first processor core. The method can also include detecting that the requested cache line data is not found in a plurality of sets of data in the first level cache and detecting that an existing cache line data stored in a least recently used data set stored in the first level cache is in an exclusive state, wherein the existing cache line data stored in the least recently used data set is to be overwritten by the requested cache line data retrieved from a second level cache. Additionally, the method can include sending a request for the requested cache line data and a physical address of the least recently used data set to the second level cache and executing additional instructions based on the first cache and data retrieved from the second cache to replace the least recently used data set.

According to another embodiment, a computer program product for managing cache devices is provided. The method may include a computer readable storage medium having program instructions embodied therewith, wherein the computer readable storage medium is not a transitory signal per se. The program instructions can be executable by a processor to cause the processor to perform a directory lookup in a first level cache for requested cache line data, wherein the requested cache line data is requested by an instruction executed by the first processor core. The program instructions can be executable by a processor to cause the processor to detect that the requested cache line data is not found in a plurality of sets of data in the first level cache and detect that an existing cache line data stored in a least recently used data set stored in the first level cache is in an exclusive state, wherein the existing cache line data stored in the least recently used data set is to be overwritten by the requested cache line data retrieved from a second level cache. Additionally, the program instructions can be executable by a processor to cause the processor to send a request for the requested cache line data and a physical address of the least recently used data set to the second level cache and execute additional instructions based on the first cache and data retrieved from the second cache to replace the least recently used data set.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
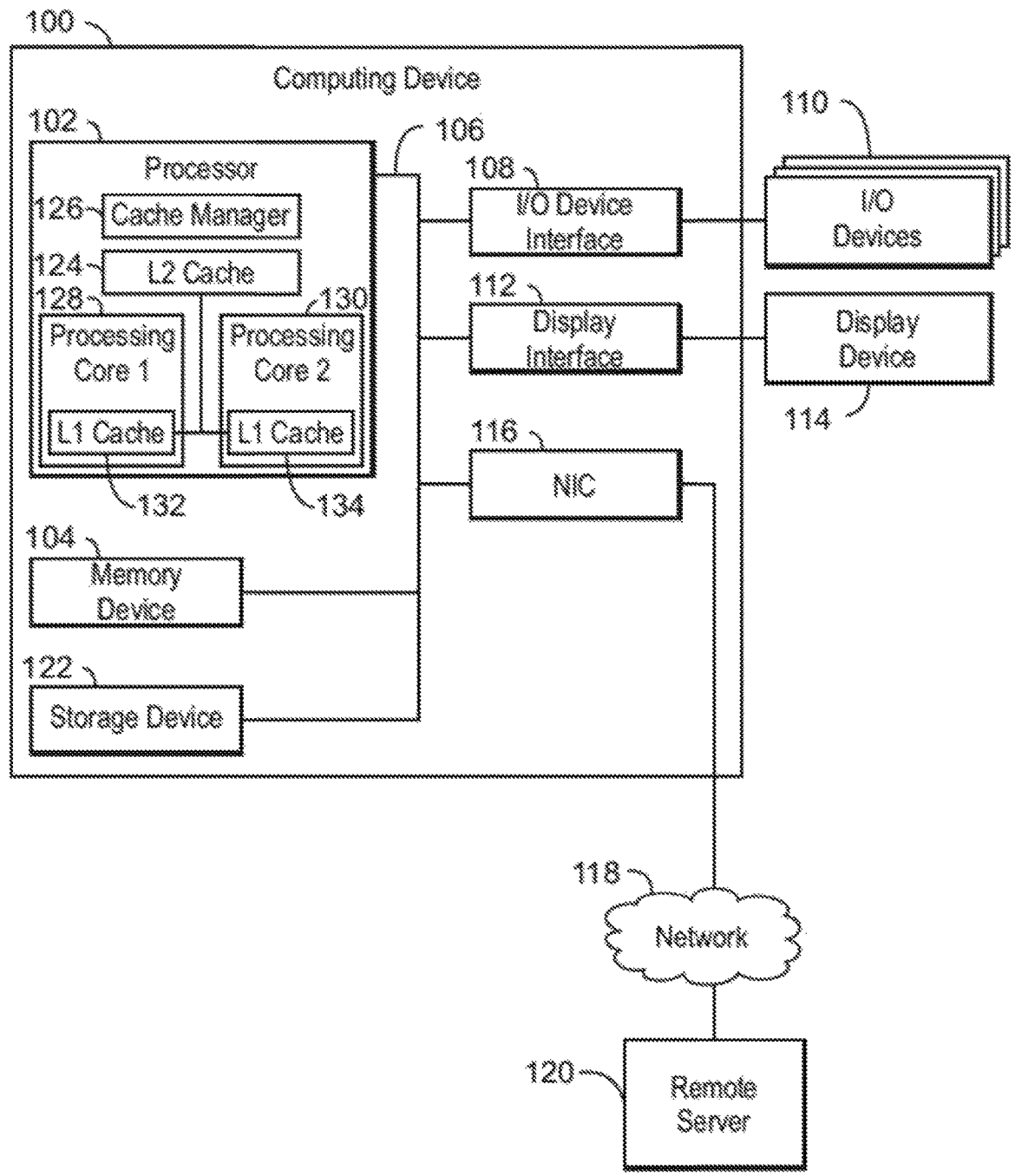
FIG. 1 depicts a block diagram of an example computing system that can manage cache devices according to an embodiment described herein.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to managing cache devices, and more specifically, but not exclusively, to retrieving data from a cache for executing instructions. The following described exemplary embodiments provide a system, method, and program product to, among other things, retrieving data from a cache for executing instructions.

Computing systems can store data in any number of memory devices, such as cache devices that can store temporary copies of data retrieved from storage devices. For example, storage devices may store persistent copies of data in large, slow devices. A computing device may include additional cache devices that retrieve data from the storage device and use the data in smaller non-persistent or persistent memory devices with faster access times. In some examples, a computing device can include a hierarchy of several cache devices that are progressively smaller and faster leading to a first level cache device residing on a processor circuit. In some examples, copies of data can be stored in multiple locations within the cache devices and the storage device. The copies of data can be managed by components such as a memory management unit associated with a processor.

In a current implementation, if a first level cache device (also referred to herein as L1) attempts to retrieve data from a second level cache (also referred to herein as L2), L1 will send a signal to L2 indicating that an over-written or aging out data line no longer exists in the L1 cache. The current implementations require knowing the physical address of an L1 aging out data line, which requires reading the L1 cache directory for that specific line and set (for an N-way set associative cache) where the physical address is stored. This L1 directory reading requires additional control logic, and the processor cannot access the L1 cache for other fetches at the same time, which results in bandwidth performance degradation. In some examples, a device may buffer L1 aging out data requests in order to access the L1 cache directory when the processor is idle, but then the processor will need extra registers. This technique can also drop some L1 aging out data requests due to the limited number of registers. In other examples, to obtain the physical address of the L1 aging out data line, a device may use the original L1 lookup (that lookup which missed the L1) by reading the physical address of the about to be aged out L1 data line. However, this implementation can require storing that physical address until the response will arrive from L2 and the L1 line is actually aged out. Accordingly, this implementation can require additional registers and can also result in dropping some L1 aging out data requests due to the limited number of registers.

In some examples, L2 cache can store a list for each L1 cache, wherein the list indicates cache data lines owned or stored by each L1 cache and the status of the cache data lines. For example, the status can indicate that an L1 cache device has read only access to a stored cache data line or exclusive access to a stored cache data line that enables modifying the cache data line. In an example, if a processing core A requests a cache data line from L2 cache and L2 cache determines that processing core B has the requested cache data line with exclusive access, the L2 cache must first request the processing core B to invalidate the cache data line before sending the cache data line to processing core A. This process takes several cycles.

The techniques described herein provide a performance improvement. For example, if processing core B is to replace a first cache data line with a second cache data line, such as a least recently used (LRU) data line, processing core B can signal L2 cache that processing core B does not own the first cache data line. Accordingly, if processing core A requests access to the first cache data line, L2 cache can provide access to the first cache data line to processing core A immediately.

In some embodiments described herein, instead of sending a signal to L2 cache when a data line ages out of an L1 cache, a device can send the signal earlier when a data fetch request misses the L1 cache and a request for data is sent to L2 cache. For example, a device can perform a directory lookup in a first level cache for cache line data, wherein the cache line data is requested by an instruction executed by a first processor core. In some examples, the device can also detect that the requested cache line data is not found in a plurality of sets of data in the first level cache. Additionally, the device can detect that existing cache line data stored in a least recently used data set stored in the first level cache is in an exclusive state, wherein the existing cache line data stored in the least recently used data set is to be overwritten by the requested cache line data retrieved from a second level cache. Furthermore, the device can send a request for the requested cache line data and a physical address of the least recently used data set to the second level cache. Moreover, the device can execute additional instructions based on the first cache and data retrieved from the second cache to replace the least recently used data set.

In some examples, an executed application can use a logical address and a processing core can translate the logical address into a physical address. Two identical applications that are executed in parallel can use the same logical address, but each logical address will be mapped by the operating system to different physical addresses. When doing a lookup in L1 directory, a processing core can use part of the logical address bits as an index, but the processing core uses the unique physical address as a tag for hit or miss detection. When an L1 cache device is to signal an L2 cache device that a least recently used cache data line in the L1 cache device is to be replaced, the L1 cache device can send the physical address of the least recently used cache data line to the L2 cache device. Accordingly, the logical address of requested data does not define cache line data in an injective way.

Accordingly, the techniques described herein can enable a first level cache to replace a cache line with data from a second level cache without additional registers or additional searches of a first level cache directory. For example, when a processor is performing a data lookup in the first level (L1) cache and does not find the requested cache data, the processor can maintain or keep the physical address of the cache data to be replaced in the first level cache and send the physical address to a second level cache.

With reference now to FIG. 1, an example computing device is depicted that can manage cache devices. The computing device 100 may be for example, a server, desktop computer, laptop computer, tablet computer, or smartphone. In some examples, computing device 100 may be a cloud computing node. The computing device 100 may be described in the general context of computer system executable instructions, such as program modules, being executed by a computer system. Generally, program modules may include routines, programs, objects, components, logic, data structures, and so on that perform particular tasks or implement particular abstract data types. The computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is adapted to execute stored instructions, and a memory device 104 to provide temporary memory space for operations of said instructions during operation. The processor 102 can be a single-core processor, multi-core processor, computing cluster, or any number of other configurations.

The memory 104 can include random access memory (RAM), read only memory, flash memory, or any other suitable memory systems.

The processor 102 may be connected through a system interconnect 106 (e.g., PCI (Peripheral Component Interconnect), PCI-Express, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to a network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. A remote server 120 may connect to the computing device 100 through the network 118.

The processor 102 may also be linked through the system interconnect 106 to a storage device 122 that can include a hard drive, an optical drive, a USB flash drive, an array of drives, or any combinations thereof. The storage device 122 can include data stored in a persistent state that is requested to populate the memory device 104.

In some embodiments, the processor 102 can include cache devices such as L2 cache 124 and a cache manager 126. The L2 cache device 124 can store data and instructions retrieved from the memory device 104 and the storage device 122 that are to be executed by the processor 102. In some examples, the cache devices 124 can include multiple levels of cache such as L1 cache and L2 cache. In some embodiments, the processor 102 can include multiple processing cores 128 and 130 that can execute instructions independently using parallel processing techniques. Each processing core 128 and 130 can have a separate first level (L1) cache 132 and 134, respectively, and multiple processing cores 128 and 130 can share a second level (L2) cache 124. For example, if a processing core 128 or 130 of the processor 102 requests data not stored in the L1 cache 132 or 134, the processing core 128 or 130 can attempt to retrieve the requested data from the L2 cache 124. In some embodiments, the computing device 100 can include a third level (L3) cache (not depicted) that can reside in the processor 102 or as a separate component. The third level cache can provide data to the second level cache in response to a request for data that is not included in a first level cache or a second level cache.

In some embodiments, the cache manager 126 can perform a directory lookup in a first level cache 132 for cache line data, wherein the cache line data is requested by an instruction executed by a first processor core 128. The cache manager 126 can also detect that the requested cache line data is not found in a plurality of sets of data in the first level cache 132. Furthermore, the cache manager 126 can detect that existing cache line data stored in a least recently used data set stored in the first level cache 132 is in an exclusive state, wherein the existing cache line data stored in the least recently used data set is to be overwritten by the requested cache line data retrieved from a second level cache such as L2 cache 124. Additionally, the cache manager 126 can send a request for the requested cache line data and a physical address of the least recently used data set to the second level cache 124. Furthermore, the processing core 128 can execute additional instructions based on the first level cache L1 132 and data retrieved from the second level cache L2 124 to replace the least recently used data set.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, cache devices, modules, additional network interfaces, etc.). Furthermore, any of the functionalities of the cache manager 126 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the cache manager 126 can be implemented with logic, wherein the logic, as referred to herein, can include any suitable hardware (e.g., a processor, among others), software (e.g., an application, among others), firmware, or any suitable combination of hardware, software, and firmware.

Figure 2:
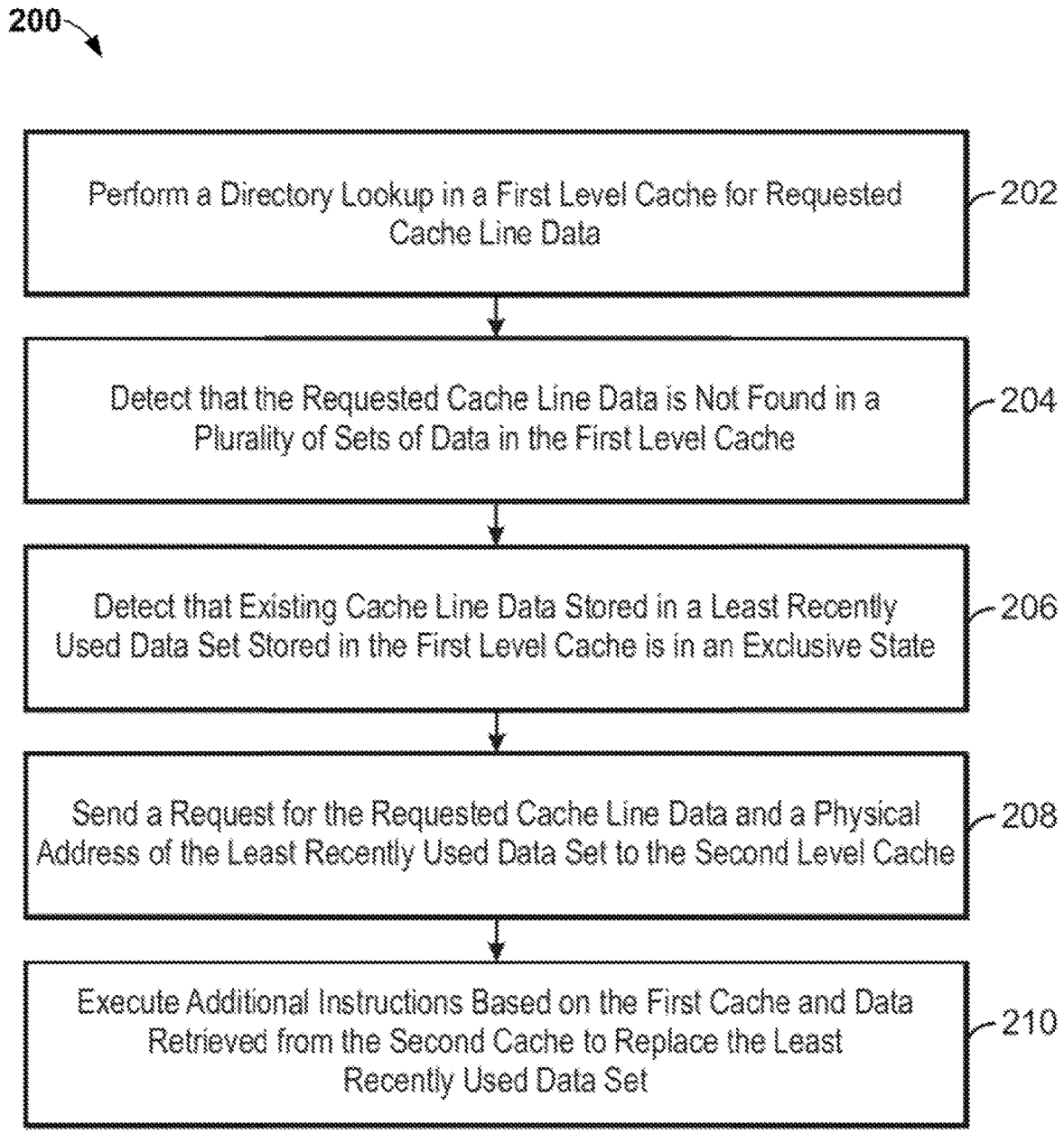
FIG. 2 is a process flow diagram of an example method that can manage cache devices according to an embodiment described herein.

FIG. 2 is a process flow diagram of an example method 200 that can manage cache devices. The method 200 can be implemented with any suitable computing device, such as the computing device 100 of FIG. 1.

At block 202, a first processor core can perform a directory lookup in a first level cache for requested cache line data, wherein the requested cache line data is requested by an instruction executed by the first processor core. In some embodiments, a first processor core can detect an instruction that requests data for an operand of the instruction. For example, the instruction can include a mathematical operation based on two operands, among others. The first processor core can perform a directory lookup in the first level cache for the cache line data including memory addresses for the operands of the instruction. For example, the first processor core can use any bits of a logical address of the requested cache line data to search for a corresponding physical memory address stored in a first level cache directory. In some examples, a first level cache can store a plurality of sets of data in at least one cache line. In some examples, a first level cache is accessed exclusively by a first processor core and a second level cache access is shared between the first processor core and a second processor core.

At block 204, the first processor core can detect that the requested cache line data is not found in a plurality of sets of data in the first level cache. In some embodiments, the first processor core can determine that a physical address corresponding to a logical address of requested cache line data is not present in the first level cache directory. In some examples, such an event can be referred to as a cache level miss and the requested data is to be requested from a higher level cache device. In some embodiments, at least one cache line is accessible by a congruence class of bits of a logical address corresponding to the requested cache line data. The congruence class of bits can include any suitable number of consecutive bits of a logical address. For example, the congruence class of bits can include a number of bits based on a big endian or little endian format.

At block 206, the first processor core can detect that existing cache line data stored in a least recently used data set stored in the first level cache is in an exclusive state, wherein the existing cache line data stored in the least recently used data set is to be overwritten by the requested cache line data retrieved from a second level cache. In some examples, data stored in the first level cache can be in an exclusive state or a non-exclusive state. An exclusive state indicates that the data can be modified by the first processor core and the modified data can be returned to a higher level cache. Additional processor cores cannot read or access the exclusive data while the data is being modified. A non-exclusive state indicates that the data stored in a first level cache is not to be modified so that multiple processor cores can execute instructions with copies of the data stored in a higher level cache device. In some embodiments, the second level cache can determine if a second processor core can have exclusive access to cache line data not owned by the first processor core. For example, the second level cache can store bits indicating whether data retrieved by first level cache are executed in an exclusive state or non-exclusive state.

A least recently used data set can indicate cache line data that has been accessed last. For example, a cache device can store four cache lines of data and the cache line last accessed to execute an instruction by the first processing core can be identified as the least recently used data set. The least recently used data set stored in the first level cache device can be overwritten by data from a higher level cache device in response to a cache miss. For example, if the first processor core requests data that is not stored in the first level cache directory, the first processor core can request the data from a higher level cache, such as a second level cache device. The requested data from the higher level cache device can overwrite the least recently used data set.

At block 208, the first processor core can send a request for the requested cache line data and a physical address of the least recently used data set to the second level cache. In some embodiments, the first processor core can send both a request for the requested cache line data that is not present in the first level cache directory and the physical address of the least recently used data set to the second level cache. In some examples, the second level cache can indicate that the cache line data previously owned by the first level cache in the least recently used data set is no longer owned by the first level cache of the first processor core.

At block 210, the first processor core can execute additional instructions based on the first cache and data retrieved from the second cache to replace the least recently used data set. In some embodiments, the first processor core can overwrite the least recently used data in the first level cache directory with the requested data from the second level cache. The first processor core can then execute additional instructions based on the retrieved data from the second level cache and repeat blocks 202-208 if a subsequent instruction requests data not present in the first level cache directory.

The process flow diagram of FIG. 2 is not intended to indicate that the operations of the method 200 are to be executed in any particular order, or that all of the operations of the method 200 are to be included in every case.

Figure 3:
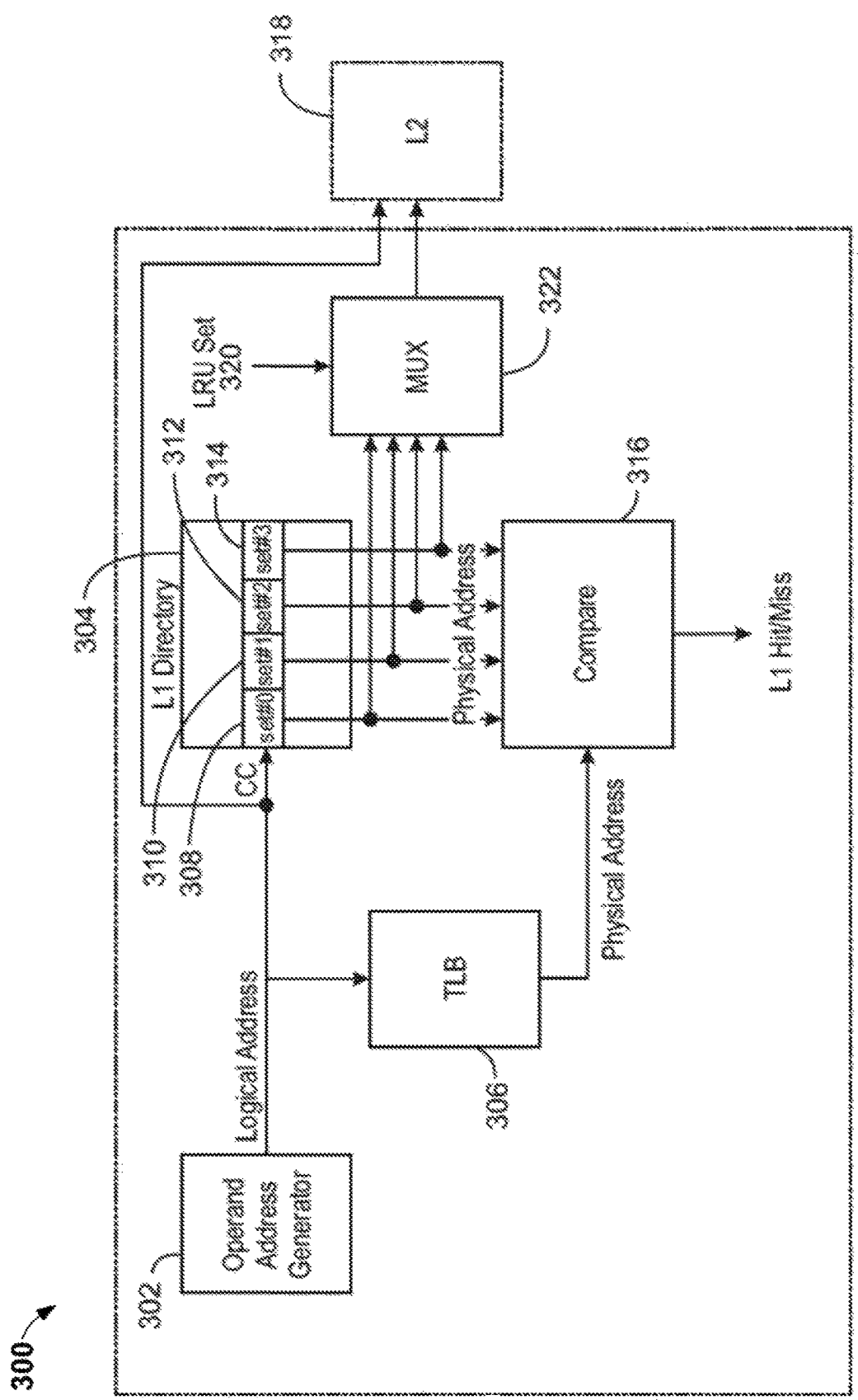
FIG. 3 is an example block diagram of a system for managing cache devices.

FIG. 3 is an example block diagram of a system 300 for managing cache devices. In some embodiments, the system 300 can include an operand address generator 302 that calculates a logical address of an operand of an instruction to be executed by a processing core. In some embodiments, the logical address can be a memory address at which an item such as a memory cell appears to reside from the perspective of an executing application program. The logical address can be generated by a processor. In some examples, a logical address may be different from the physical address due to the operation of an address translator or mapping function. In some examples, a mapping function may be a memory management unit (MMU) between a processor and the memory bus.

In some embodiments, the operand address generator 302 transmits the logical address for requested data to a first level cache directory 304 and a translation look aside buffer (TLB) 306. The first level cache directory 304 can store physical memory addresses corresponding to data stored in the first level cache in any suitable number of data lines. In some examples, each data line can store any number of sets of data such as data set 0 308, data set 1 310, data set 2 312, and data set 3 314. In some embodiments, a number of bits of the logical address can be compared to the data sets 308-314. If the bits of the logical address match a data set 308-314, the physical address can be transmitted to compare logic 316. In some embodiments, the compare logic 316 can compare the physical address from the first level cache directory 304 to a physical address retrieved from the translation look aside buffer 306. The translation look aside buffer 306 can include any suitable number of logical addresses and a mapping to a corresponding physical address. Accordingly, the compare logic 316 can detect if a physical address corresponding to the logical address from the first level cache directory 304 matches a physical address stored in the translation look aside buffer 306. If the compare logic 316 detects a matching physical address from the translation look aside buffer 306 and the first level cache directory 304, then the requested data resides in the first level cache and a first level cache hit has been detected. If the compare logic 316 detects that a matching physical address from the translation look aside buffer 306 cannot be located in the first level cache directory 304, then a cache miss has occurred and the requested data is to be retrieved from a second level cache (L2) 318.

In some embodiments, in response to detecting a first level cache miss, a least recently used data set 320 can be selected by a multiplexor 322. The least recently used data set 320 can indicate a data set 308-314 that was last used to execute an instruction by a processor. The selected data set 308, 310, 312, or 314 that is identified as the least recently used data set can include a physical address corresponding to the least recently used data. The physical address of the least recently used data set can be transmitted to the second level cache 318 along with a request to retrieve requested data that does not reside in the first level cache. Accordingly, the first level cache can prevent additional searches of the first level cache directory 304 to identify the least recently used physical address and the first level cache can transmit the physical address to the second level cache 318 without additional registers.

In some embodiments, the second level cache 318 can identify the requested data and transmit the requested data to the first level cache. The first level cache can overwrite the least recently used data set in the first level cache directory 304 with the requested data returned by the second level cache 318. In some examples, an attempt by the first level cache to access the least recently used data set following the transmission of the physical address of the least recently used data set to the second level cache 318 can be interpreted as a first level cache miss.

It is to be understood that the block diagram of FIG. 3 is not intended to indicate that the system 300 is to include all of the components shown in FIG. 3. Rather, the system 300 can include fewer or additional components not illustrated in FIG. 3 (e.g., additional memory components, cache devices, modules, additional network interfaces, etc.).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
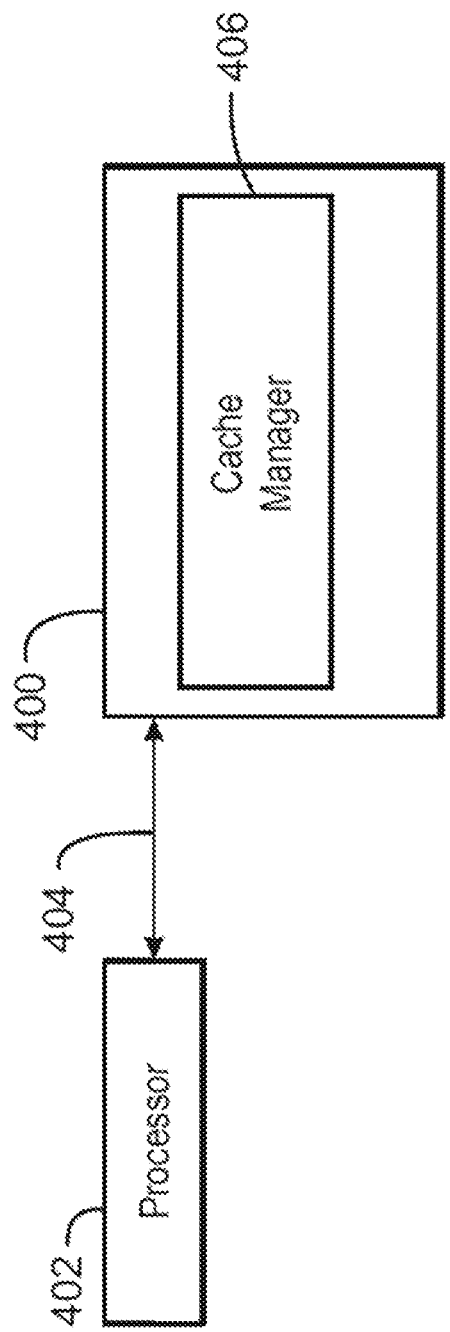
FIG. 4 is a tangible, non-transitory computer-readable medium that can manage cache devices according to an embodiment described herein.

Referring now to FIG. 4, a block diagram is depicted of an example of a tangible, non-transitory computer-readable medium that can manage cache devices. The tangible, non-transitory, computer-readable medium 400 may be accessed by a processor 402 over a computer interconnect 404.

Furthermore, the tangible, non-transitory, computer-readable medium 400 may include code to direct the processor 402 to perform the operations of the current method. For example, a cache manager 406 can perform a directory lookup in a first level cache for requested cache line data, wherein the requested cache line data is requested by an instruction executed by the first processor core. The cache manager 406 can also detect that the requested cache line data is not found in a plurality of sets of data in the first level cache. In addition, the cache manager 406 can detect that existing cache line data stored in a least recently used data set stored in the first level cache is in an exclusive state, wherein the existing cache line data stored in the least recently used data set is to be overwritten by the requested cache line data retrieved from a second level cache. Furthermore, the cache manager 406 can send a request for the requested cache line data and a physical address of the least recently used data set to the second level cache and execute additional instructions based on the first cache and data retrieved from the second cache to replace the least recently used data set.

It is to be understood that any number of additional software components not shown in FIG. 4 may be included within the tangible, non-transitory, computer-readable medium 400, depending on the specific application. Furthermore, fewer software components than those shown in FIG. 4 can be included in the tangible, non-transitory, computer-readable medium 400.

Figure 5:
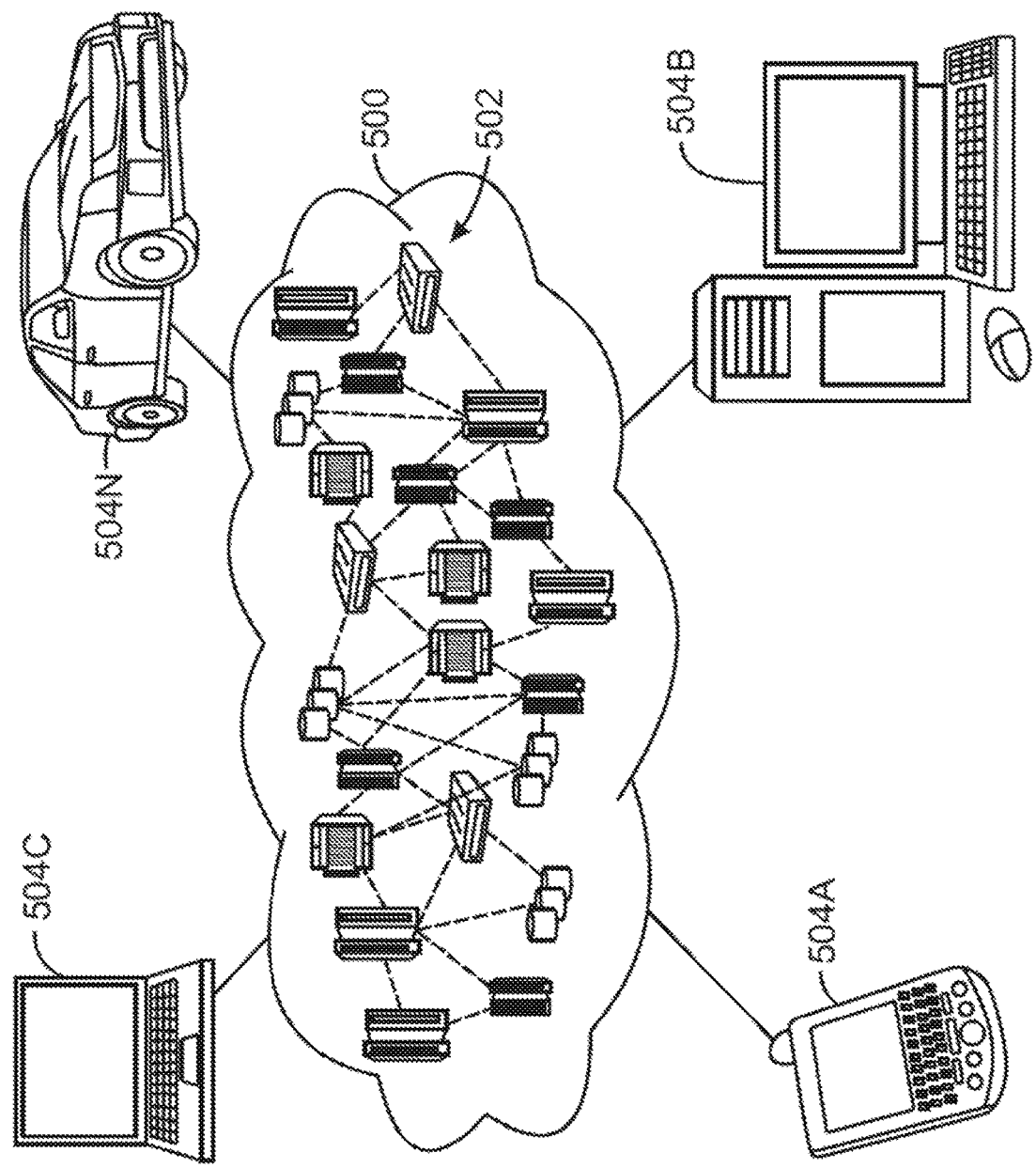
FIG. 5 depicts an illustrative cloud computing environment according to an embodiment described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
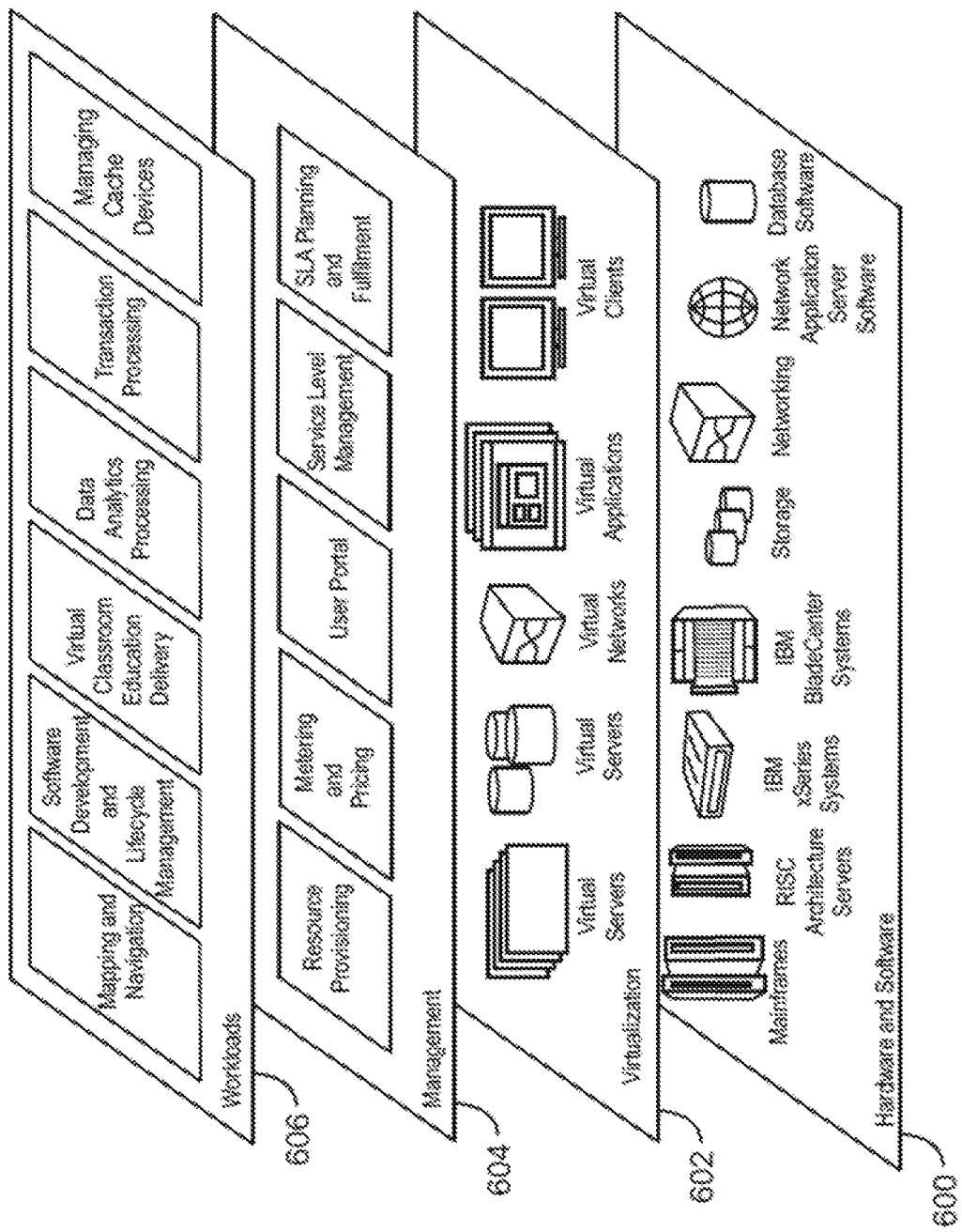
FIG. 6 depicts a set of functional abstraction layers provided by a cloud computing environment according to an embodiment described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and managing cache devices.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for managing cache devices, the system comprising:
   one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
   detecting that requested cache line data is not found in a plurality of sets of data in a first level cache;
   detecting that existing cache line data stored in a least recently used data set stored in the first level cache is in an exclusive state, wherein the existing cache line data stored in the least recently used data set is to be overwritten by the requested cache line data retrieved from a second level cache;
   sending a request for the requested cache line data and a physical address of the least recently used data set to the second level cache; and
   executing additional instructions based on the first level cache and data retrieved from the second level cache to replace the least recently used data set.

2. The computer system of claim 1, wherein the second level cache is operable to indicate that the existing cache line data owned by the first level cache in the least recently used data set is not owned by the first level cache of the first processor core.

3. The computer system of claim 1, wherein the first level cache is operable to store the plurality of sets of data in at least one cache line.

4. The computer system of claim 3, wherein the at least one cache line is accessible by a congruence class of bits of a logical address corresponding to the requested cache line data.

5. The computer system of claim 3, wherein a first level cache directory comprises a physical memory address associated with the logical address of the requested cache line data.

6. The computer system of claim 1, wherein the first level cache is accessed exclusively by the first processor core and wherein the second level cache access is shared between the first processor core and a second processor core.

7. The computer system of claim 2, wherein the second level cache is operable to determine if a second processor core has exclusive access to the existing cache line data not owned by the first processor core.

8. A method for managing cache devices, the method comprising:
   detecting that requested cache line data is not found in a plurality of sets of data in a first level cache;
   detecting that existing cache line data stored in a least recently used data set stored in the first level cache is in an exclusive state, wherein the existing cache line data stored in the least recently used data set is to be overwritten by the requested cache line data retrieved from a second level cache;
   sending a request for the requested cache line data and a physical address of the least recently used data set to the second level cache; and
   executing additional instructions based on the first level cache and data retrieved from the second level cache to replace the least recently used data set.

9. The method of claim 8, wherein the second level cache indicates that the existing cache line data owned by the first level cache in the least recently used data set is not owned by the first level cache of the first processor core.

10. The method of claim 8, wherein the first level cache stores the plurality of sets of data in at least one cache line.

11. The method of claim 10, wherein the at least one cache line is accessible by a congruence class of bits of a logical address corresponding to the requested cache line data.

12. The method of claim 10, wherein a first level cache directory comprises a physical memory address associated with the logical address of the requested cache line data.

13. The method of claim 8, wherein the first level cache is accessed exclusively by the first processor core and wherein the second level cache access is shared between the first processor core and a second processor core.

14. The method of claim 9, wherein the second level cache determines if a second processor core has exclusive access to the existing cache line data not owned by the first processor core.

15. A computer program product for managing cache devices, the computer program product comprising:
   one or more computer-readable tangible storage media and program instructions stored on at least one of the one or more tangible storage media, the program instructions executable by a processor, the program instructions comprising:
   program instructions to detect that requested cache line data is not found in a plurality of sets of data in a first level cache;
   program instructions to detect that existing cache line data stored in a least recently used data set stored in the first level cache is in an exclusive state, wherein the existing cache line data stored in the least recently used data set is to be overwritten by the requested cache line data retrieved from a second level cache;
   program instructions to send a request for the requested cache line data and a physical address of the least recently used data set to the second level cache; and
   program instructions to execute additional instructions based on the first level cache and data retrieved from the second level cache to replace the least recently used data set.

16. The computer program product of claim 15, wherein the second level cache is operable to indicate that the existing cache line data owned by the first level cache in the least recently used data set is not owned by the first level cache of the first processor core.

17. The computer program product of claim 15, wherein the first level cache is operable to store the plurality of sets of data in at least one cache line.

18. The computer program product of claim 17, wherein the at least one cache line is accessible by a congruence class of bits of a logical address corresponding to the requested cache line data.

19. The computer program product of claim 17, wherein a first level cache directory comprises a physical memory address associated with the logical address of the requested cache line data.

20. The computer program product of claim 15, wherein the first level cache is accessed exclusively by the first processor core and wherein the second level cache access is shared between the first processor core and a second processor core.

* * * * *